US009565302B2

(12) United States Patent
Anderson

(10) Patent No.: US 9,565,302 B2
(45) Date of Patent: *Feb. 7, 2017

(54) AUTOMATIC CONTEXTUAL MEDIA RECORDING AND PROCESSING UTILIZING SPEECH ANALYTICS

(71) Applicant: AT&T Intellectual Property I, L.P., Atlanta, GA (US)

(72) Inventor: David Anderson, Lawrenceville, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 36 days.

This patent is subject to a terminal disclaimer.

(21) Appl. No.: 14/547,544

(22) Filed: Nov. 19, 2014

(65) Prior Publication Data

US 2015/0071419 A1  Mar. 12, 2015

Related U.S. Application Data

(63) Continuation of application No. 13/687,430, filed on Nov. 28, 2012, now Pat. No. 8,917,829, which is a continuation of application No. 11/881,564, filed on Jul. 27, 2007, now Pat. No. 8,345,831.

(51) Int. Cl.
| | |
|---|---|
| *H04M 1/64* | (2006.01) |
| *H04M 3/42* | (2006.01) |
| *G10L 15/26* | (2006.01) |
| *H04M 3/51* | (2006.01) |
| *H04M 1/656* | (2006.01) |

(52) U.S. Cl.
CPC .......... *H04M 3/42221* (2013.01); *G10L 15/26* (2013.01); *G10L 15/265* (2013.01); *H04M 1/656* (2013.01); *H04M 3/51* (2013.01); *H04M 2201/40* (2013.01); *H04M 2203/301* (2013.01)

(58) Field of Classification Search
CPC .. H04M 3/533; H04M 3/493; H04M 3/42221; G10L 15/26
USPC ....................................................... 379/88.08
See application file for complete search history.

(56) References Cited

U.S. PATENT DOCUMENTS

| | | | |
|---|---|---|---|
| 6,035,017 A | 3/2000 | Fenton et al. | |
| 7,672,845 B2 | 3/2010 | Beranek et al. | |
| 7,831,989 B1 * | 11/2010 | Calzone | H04L 12/2801 370/428 |

(Continued)

*Primary Examiner* — Simon King

(57) ABSTRACT

Embodiments are provided for the automatic real-time recording and processing of media in a communications network based on the context of the media. In one embodiment, a media stream is received in an analysis module in a service platform in the communications network. The media stream may represent a communication session between a calling party and a call center in the network. The incoming media steam is analyzed to identify words comprising a context of the communication session. A determination is then made as to whether the context of the communication session is related to a set of business rules associated with the service platform which may automatically trigger the retention of a recording of the communication session. If the context of the communication session is related to the set of business rules, the retention of the communication session is automatically triggered in real-time at a recording module.

20 Claims, 3 Drawing Sheets

(56) References Cited

U.S. PATENT DOCUMENTS

| | | | |
|---|---|---|---|
| 7,860,722 B1* | 12/2010 | Chow | H04M 3/2281 379/88.02 |
| 7,940,897 B2* | 5/2011 | Khor | G06Q 30/02 379/88.02 |
| 2004/0234056 A1 | 11/2004 | Heilmann et al. | |
| 2006/0003830 A1* | 1/2006 | Walker | G06Q 10/063 463/20 |
| 2011/0213676 A1 | 9/2011 | Singh et al. | |

* cited by examiner

AUTOMATIC CONTEXTUAL MEDIA RECORDING AND PROCESSING UTILIZING SPEECH ANALYTICS

PRIORITY INFORMATION

The present application is a continuation of U.S. patent application Ser. No. 13/687,430, filed Nov. 28, 2012, which is a continuation of U.S. patent application Ser. No. 11/881,564, filed Jul. 27, 2007, now U.S. Pat. No. 8,345,831, issued Jan. 1, 2013, the contents of which are incorporated herein by reference in their entirety.

BACKGROUND

Call centers, such as customer service centers, dispatch centers and E911 centers, typically record conversations with center personnel either by recording (i.e., logging) all calls as they are received or by manually activating the recording of a call after identifying its context in order to recognize and respond to relevant customer concerns. The process of automatically recording all conversations as they are received however has become increasingly burdensome on call centers as communication networks have evolved to support the communication of video as well as audio, thus increasing the amount of data which must be recorded. As a result, call centers have been required to spend considerable time and expense to upgrade network hardware in order to support the significant bandwidth and increased storage capacity needed for communicating and archiving multimedia content, some of which may not even be relevant to a business concern of the call center, thus wasting valuable resources. In addition, the process of manually recording conversations is also problematic as it taxes call center resources by requiring the individual addressing customer issues presented during a service call to contemporaneously also manually identify the context of the call and then further record the call, thus increasing the potential for human error and unfocused support.

SUMMARY

This summary is provided to introduce a selection of concepts in a simplified form that are further described below in a Detailed Description. This summary is not intended to identify key features or essential features of the claimed subject matter, nor is it intended to be used to limit the scope of the claimed subject matter.

Embodiments are provided for the automatic real-time recording and processing of media in a communications network based on the context of the media. In one embodiment, a media stream is received in an analysis module in a service platform in the communications network. The media stream may represent a communication session between a calling party and a call center in the network. The incoming media steam is analyzed to identify words comprising a context of the communication session. A determination is then made as to whether the context of the communication session is related to a set of business rules associated with the service platform which may automatically trigger the retention of the recording of the communication session and subsequent treatment of the recording. If the context of the communication session is related to the set of business rules, the retention of the recording of the communication session is automatically triggered in real-time at a recording module.

These and other features and advantages will be or become apparent to one with skill in the art upon review of the following drawings and detailed description. It is intended that all such features and advantages be included within this description, be within the scope of the present invention, and be protected by the accompanying claims. It is to be understood that both the foregoing general description and the following detailed description are illustrative only and are not restrictive of the invention as claimed.

DETAILED DESCRIPTION

Figure 1:
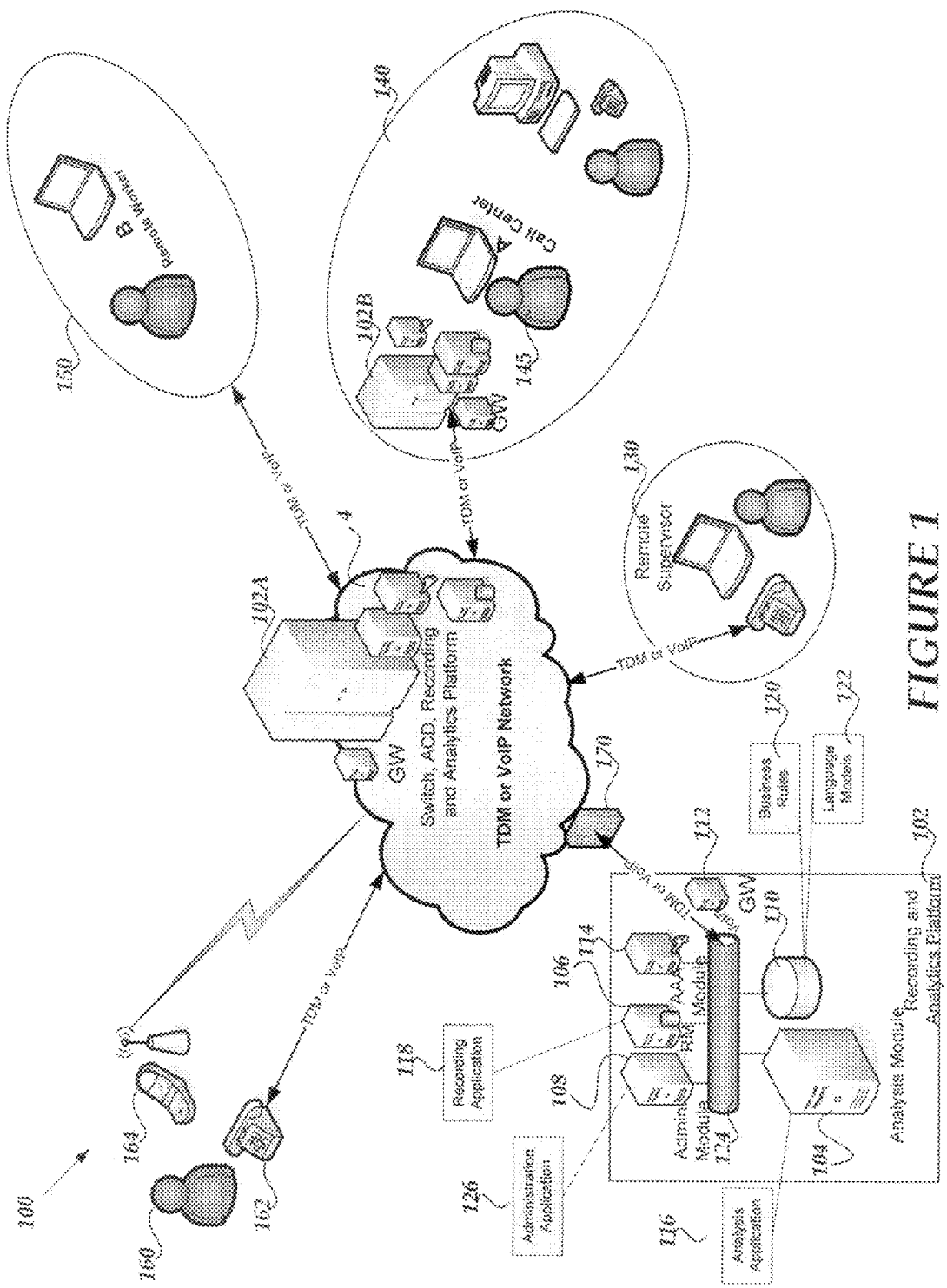
FIG. 1 is a network architecture diagram illustrating aspects of network devices utilized in and provided by various embodiments of the invention.

Embodiments are provided for the automatic real-time recording and processing of media in a communications network based on the context of the media. In one embodiment, a media stream is received in an analysis module in a service platform in the communications network. The media stream may represent a communication session between a calling party and a call center in the network. The incoming media steam is analyzed to identify words comprising a context of the communication session. A determination is then made as to whether the context of the communication session is related to a set of business rules associated with the service platform which may automatically trigger retaining the recording of the communication session. If the context of the communication session is related to the set of business rules, the recording of the communication session, currently in a system cache, is automatically retained in real-time at a recording module.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Referring now to the drawings, in which like numerals represent like elements through the several figures, various aspects of the present invention and an illustrative network environment will be described. In particular, FIG. 1 and the corresponding discussion are intended to provide a brief, general description of a suitable network in which the invention may be implemented.

Embodiments of the invention may be implemented as a computer process, a computing device, or as an article of manufacture, such as a computer program product or computer-readable media. The computer program product may be a computer storage media readable by a computer system and encoding a computer program of instructions for executing a computer process. The computer program may also be a propagated signal on a carrier readable by a computing system and encoding a computer program of instructions for executing a computer process.

Referring now to FIG. 1, an illustrative network environment 100 for the several embodiments, utilizing the techniques described herein, will be described. As shown in FIG. 1, the network environment 100 may comprise a communications network including a Recording and Analytics platform 102. The platform 102 is in communication with a remote supervisor 130, a call center 140, a remote worker 150, and/or a remote caller (e.g., customer) 160 over a network 4. In accordance with one embodiment, the network 4 may comprise a circuit switched network, such as the conventional public switched telephone network ("PSTN"), utilizing time division multiplexing ("TDM") for communicating voice and data between wireline and wireless communication devices. In accordance with an alternative embodiment, the network 4 may comprise a wide area packet switched computing network, such as the Internet, for communicating voice and data utilizing, for example, Voice over Internet Protocol ("VOIP"). Those skilled in the art should appreciate that communication between the network 4 and the Recording and Analytics platform 102, the remote supervisor 130, the call center 140, the remote worker 150, and/or the remote caller 160 may be facilitated by TDM or VoIP communication links which may include, but are not limited to a two-wire or four-wire copper telephone lines (including digital subscriber lines ("DSL")), coaxial cable lines, wireless communication links (including Wi-Fi), and the like.

In accordance with one embodiment, the Recording and Analytics platform 102 may be configured to communicate with the network 4 through a firewall 170 and may comprise various modules and databases for receiving, recording, and processing media (i.e., voice and/or data, such as video) in real-time. Each module may include a general purpose desktop, laptop, handheld, tablet, or other type of computer having at least a central processing unit, a system memory, storage capable of storing one or more application programs and other data. It should be understood that the storage may include computer-readable media such as a hard disk or CD-ROM drive, or any other available media that can be accessed or utilized by a computer. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by a computer.

The modules and databases may include, without limitation, an analysis module 104 which executes an analysis application 116, a recording module ("RM") 106 which executes a recording application 118, an administration module (108) which executes an administration application 126, a database 110 which stores business rules 120 and language models 122, such as a Statistical Language Model ("SLM") or other phonetic based language modeling used for speech analysis, a gateway module ("GW") 112, and an authentication, authorization, and accounting module ("AAA") 114. Each of the modules 104, 106, 108, 112, 114 and the database 110 may be connected to and communicate with each other over a system bus 124. It should be appreciated that, in accordance with another embodiment, the modules 104, 106, 108, 112 and 114 may comprise software program modules including routines, programs, components, data structures, and other types of structures that perform particular tasks or implement particular abstract data types. A cache memory and a separate long-term storage memory work with the recording module 106 to store media stream temporarily (in the cache) or semi-permanently (in the long-term storage). It should be understood that the Recording and Analytics platform 102 and the modules, databases, and applications contained therein, may be a separate communications platform or alternatively comprise a platform 102A incorporating a TDM/circuit or Session Initiated Protocol ("SIP") packet switch with automatic call distributor ("ACD") functionality within the network 4 or alternatively comprise a platform 102B incorporating a TDM/circuit or SIP packet switch with ACD functionality in the call center 140.

In accordance with various embodiments, and as will be described in greater detail below in the discussion of FIGS. 2 and 3, the analysis module 104 may be configured to execute the analysis application 116 for receiving a media stream which may include voice and/or data communications (including video with audio) and may further represent a communication session between the remote caller 160 and the call center 140, the remote supervisor 130, and/or the remote worker 150. In accordance with one embodiment, the received communication session may be received by the analysis module 104 over the network 4 via a TDM/circuit or packet switch (e.g., VoIP). The analysis module 104 may be configured to utilize the analysis application 116 to analyze grammar (i.e., words or phrases in the communication session in real-time to determine a context utilizing language models 122, determine if the context of the grammar in the communication session is related to the business rules 120, and if so, then automatically trigger the retention of the communication session in the recording module 106. The analysis module 104 may further be configured to process flagged segments of the communication session being recorded according to the business rules 120 and, if appropriate, initiate an action.

In accordance with various embodiments, and as will be described in greater detail below in the discussion of FIGS. 2 and 3, the recording module 106 may be configured to execute the recording application 118 and retain the recorded communication session received in the analysis module 104 and flag segments of the communication session for action and/or later use from retention (i.e., storage). The administration module 108 may be configured to execute the administration application 126 to prioritize the communication session segments flagged by the recording module 106 for immediate action and/or appropriate later retrieval.

The database 110 stores the business rules 120 and the language models 122 for use by the analysis module 104. As briefly discussed above, the business rules 120 may be applied to grammar in a communication session being analyzed by the analysis application 116 to determine relevant words to trigger retention of a recording and subsequent action. In one embodiment, the business rules 120 may include key words or phrases related to a business condition or topic serviced by the call center 140. For example, the business rules 120 for a product call to the call or service center 140 may include key words or phrases related to specific products supported by the call center 140, a product part or component in need of repair or replacement, etc. Once these words or phrases are identified by the analysis module 104, the analysis module 104 may then communicate with the recording module 106 to retain the communication session recording. The business rules 120 may also include actions to be performed or initiated by the analysis module 104 in response to an identification of the key words or phrases in a communication session. For example, the business rules 120 may include a rule that if a customer 160 in a communication with a call center agent 145 is dissatisfied with a particular product, then the supervisor 130 or a subject matter expert associated with the identified product is bridged into the session to address the customer's concern or pertinent information is retrieved to assist the agent with the issue raised. Business rules may also include ranking and routing criteria for follow-up after the call. The language models 122 may be utilized by the analysis application 116 in the analysis module 104 to recognize the discourse in the audio being communicated in a communication session. In particular, and as known to those skilled in the art, the language models 122 may comprise software defining an acoustic model, language model and/or grammar models to receive and process audio to enable the recognition of the key words or phrases defined by the business rules 120.

In accordance with one embodiment, the remote supervisor 130 may comprise a communications station including a telephone or a computer for joining into an ongoing communication session as dictated by the business rules 120. The call center 140 may comprise, in addition to the switch, ACD, and Recording and Analytics platform 102B, call agents and communications stations to respond to service calls from the remote worker 150 or the remote caller 160 via communication devices 162 and 164.

Figure 2:
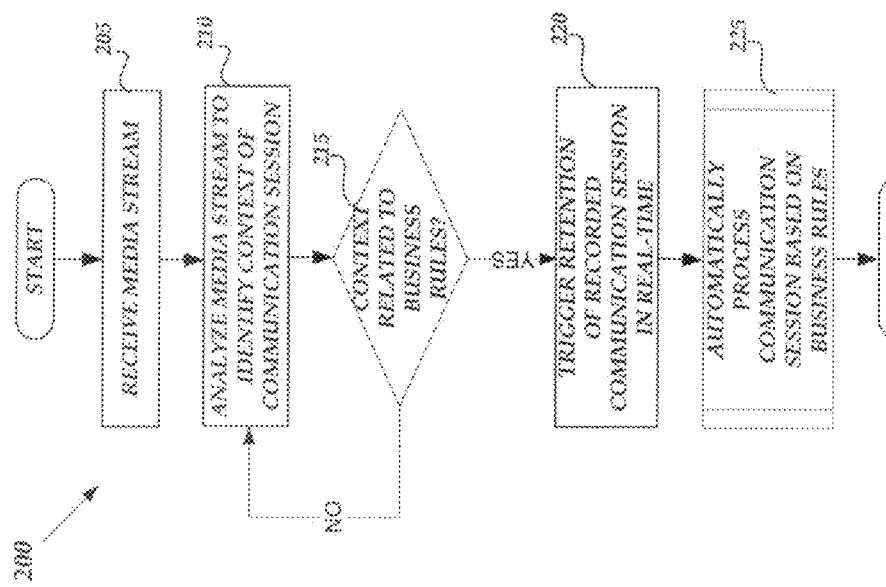
FIG. 2 is a flow diagram illustrating aspects of a process for the automatic real-time recording of media in a communications network based on the context of the media in accordance with various embodiments of the invention.

Referring now to FIG. 2, an illustrative routine 200 will be described illustrating a process performed by the Recording and Analytics platform 102 in the network environment 100 for the automatic real-time recording of media in a communications network based on the context of the media, in accordance with various embodiments. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIG. 2-3 and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

The routine 200 begins at operation 205, where the analysis application 116 executing on the analysis module 104 receives a media stream representing a communication session in the network environment 100. For example, the media stream may represent a telephone call between the remote caller 160 and the service agent 145 in the call center 140 to discuss an issue the remote caller 160 has regarding a product supported by the call center 140. It should be understood that, in accordance with various embodiments, the media stream representing the communication session may include audio and/or video content including one or more voices which is received over a single voice communication path (e.g., transmit and/or receive) or over a mixed media communication path (e.g., a voice and visual/web path). Thus, in an embodiment, the remote caller 160 may comprise multiple callers in a single communication session with the call center 140.

From operation 205, the routine 200 continues to operation 210, where the analysis application 116 analyzes the communication session in the received media stream to identify the context of the communication session. In particular, the analysis application 116 may begin processing the received words and phrases in the communication session utilizing the language models 122 to identify any key words or phrases defined in the business rules 120.

From operation 210, the routine 200 continues to operation 215, where the analysis application 116 determines if the context of the communication session is related to one or more of the business rules 120. In particular, the analysis application 116 may be configured to compare the identified words and phrases processed from the media stream to key words or phrases defined in the business rules 120.

If, at operation 215, the analysis application 116 determines that the context of the communication session is not related to the business rules 120, then the routine 200 returns to operation 210 where the analysis of the incoming media stream (or if that communication session has ceased, the next incoming media stream) continues. If no business rules in operation 215 are found to apply in each media stream, the communication session is not retained. If however, at operation 215, the analysis application 116 determines that the context of the communication session is related to the business rules 120, then the routine 200 continues to operation 220 where the analysis application 116 triggers the recording application 118 executing on the recording module 106 to retain the recorded communication session. It should be understood, the recording of the communication session occurs in real-time as the communication session between the remote caller 160 and the call center 140 (for example) continues in the network environment 100. For example, if the remote caller 160 addresses an issue with a product supported by the call center 140 and thus defined as a key word in the business rules 120, the analysis application 116 may communicate with the recording module 106 or the recording application 118 to retain the ongoing communication session.

From operation 220, the operation 200 continues to operation 225 where the analysis application 116, the recording application 118, and the administration application 126 automatically process the communication session being recorded based on the business rules 120. For example, if the remote caller 160 addresses an issue with a product supported by the call center 140 and thus defined as a key word in the business rules 120, the analysis application 116 may communicate with the recording module 106 or the recording application 118 to retain the entire communication session, or a portion of the communication session as directed by a business rule. An illustrative process for automatically processing a recorded communication session will be discussed in greater detail below with respect to FIG. 3. The routine 200 then ends.

Figure 3:
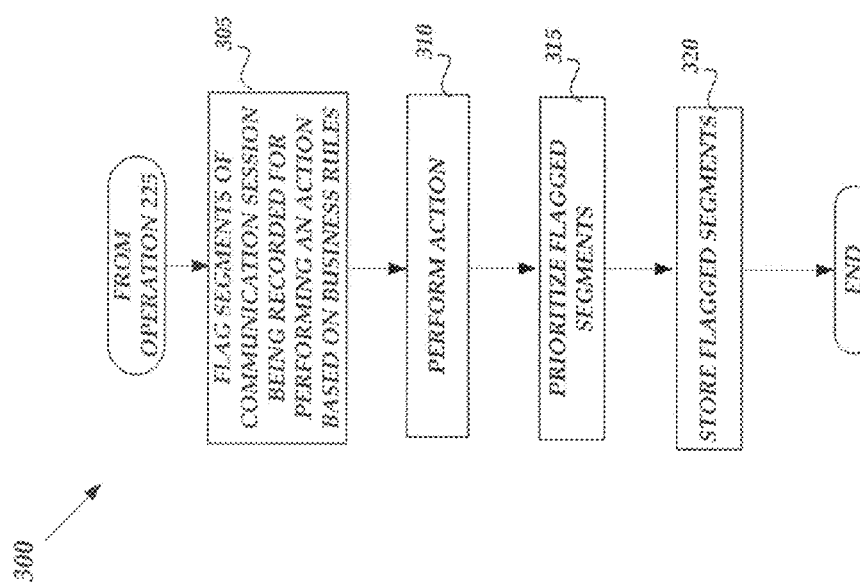
FIG. 3 is a flow diagram illustrating aspects of a process for the automatic processing of recorded media in a communications network based on the context of the media in accordance with various embodiments of the invention.

Turning now to FIG. 3, a routine 300 for the automatic processing of recorded media in the communications environment 100 based on the context of the media, in accordance with various embodiments will now be described. The routine 300 begins from operation 225 in FIG. 2 and continues to operation 305 where the analysis application 116 applies the business rules 120 to the communication session being recorded to determine further action (if any) and instructs the recording application 118 executing on the recording module 106 to flag those segments of the communication session identified as requiring an action based on the business rules 120. In particular, a portion of a communication session being recorded may be flagged by the recording application 118 for retention (i.e., storage in long-term storage, rather than a cache memory) and subsequent action by highlighting a specific segment in the spectragram representing the audio portion of the communication session for later routing, reference and replay.

From operation 305, the routine 300 continues to operation 310 where the analysis application 116 performs the action as defined in the business rules 120, for the flagged segments of the communication session. The action may be performed in real-time and be based on the audio portion of the flagged segments. For example, the business rules 120 may specify that a subject matter expert or the supervisor 130 be automatically bridged into an ongoing communication session to assist the call center agent 145 if, in the communication session being recorded, a caller identifies a problem regarding a particular product or service and the agent 145 is unable to assist the caller 160. In this manner, the supervisor 130 is available to address the caller's problem during the same call. It will be appreciated that if the business rules 120 do not specify an action for a portion of or an entire communication session currently being recorded (i.e., nothing in the communication session triggers a retention flag,) then the communication session is not retained and any record associated with the communication session (e.g., audio and screen data recorded a call center communications station) may be deleted.

From operation 310, the operation 300 continues to operation 315 where the administration application 126 executing on the administration module 108, prioritizes the flagged segments of the communication session for later retrieval. In particular, the flagged segments from a communication session with the call center 140 may be categorized and ranked for immediate retrieval and review by a call center manager or supervisor 130 in a call log which may also include the time and/or date of each session in the log. It should be understood that the actual recorded communication session segments (e.g., the actual audio) may be stored and retrieved from the recording module 106.

From operation 315, the operation 300 continues to operation 320 where the recording application 118 stores the recorded flagged communication segments in the recording module 106 as they are being recorded for later routing, retrieval and review. The routine 300 then ends.

It will be apparent by those skilled in the art that various modifications or variations may be made in the present invention without departing from the scope or spirit of the invention. Other embodiments of the present invention will be apparent to those skilled in the art from consideration of the specification and practice of the invention disclosed herein.

I claim:

1. A method comprising:
while receiving a media stream associated with a communication session between a calling party and a called party:
storing the media stream in a cache, to yield a cached copy; and
analyzing, via a processor, the media stream to yield a context and a business assessment value, the business assessment value comparing the context to business rules associated with a service platform providing the communication session; and
when the processor determines the business assessment value reaches a threshold, bridging a new party into the communication session and transferring a portion of the cached copy to a long-term storage, wherein the portion of the cached copy comprises less than a full version of the communication session, the portion of the cached copy being chosen based on the business rules.

2. The method of claim 1, further comprising:
when the communication session ends without the business assessment value reaching the threshold, deleting the cached copy.

3. The method of claim 1, the media stream comprising audio and video content.

4. The method of claim 1, wherein the analyzing of the media stream further comprises:
flagging an event in the cached copy when a specific rule in the business rules is met, to yield a flagged segment; and
transferring the flagged segment of the cached copy to the long-term storage.

5. The method of claim 4, wherein the flagged segment has a priority in the long-term storage for later retrieval.

6. The method of claim 1, wherein the media stream comprises an audio-only content stream.

7. The method of claim 1, wherein analyzing the media stream further comprises utilizing language model dependent speech recognition to identify phrases associated with the context.

8. A system comprising:
a processor; and
a computer-readable storage medium having instructions stored which, when executed by the processor, result in operations comprising:
while receiving a media stream associated with a communication session between a calling party and a called party:
storing the media stream in a cache, to yield a cached copy; and
analyzing the media stream to yield a context and a business assessment value, the business assessment value comparing the context to business rules associated with a service platform providing the communication session; and
when the processor determines the business assessment value reaches a threshold, bridging a new party into the communication session and transferring a portion of the cached copy to a long-term storage, wherein the portion of the cached copy comprises less than a full version of the communication session, the portion of the cached copy being chosen based on the business rules.

9. The system of claim 8, the computer-readable storage medium having additional instructions stored which, when executed by the processor, result in operations comprising:
when the communication session ends without the business assessment value reaching the threshold, deleting the cached copy.

10. The system of claim 8, the media stream comprising audio and video content.

11. The system of claim 8, wherein the analyzing of the media stream further comprises:
flagging an event in the cached copy when a specific rule in the business rules is met, to yield a flagged segment; and transferring the flagged segment of the cached copy to the long-term storage.

12. The system of claim 11, wherein the flagged segment has a priority in the long-term storage for later retrieval.

13. The system of claim 8, wherein the media stream comprises an audio-only content stream.

14. The system of claim 8, wherein analyzing the media stream further comprises utilizing language model dependent speech recognition to identify phrases associated with the context.

15. A computer-readable storage device having instructions stored which, when executed by computing device, result in operations comprising:
  while receiving a media stream associated with a communication session between a calling party and a called party:
  storing the media stream in a cache, to yield a cached copy; and
  analyzing the media stream to yield a context and a business assessment value, the business assessment value comparing the context to business rules associated with a service platform providing the communication session; and
  when the processor determines the business assessment value reaches a threshold, bridging a new party into the communication session and transferring a portion of the cached copy to a long-term storage, wherein the portion of the cached copy comprises less than a full version of the communication session, the portion of the cached copy being chosen based on the business rules.

16. The computer-readable storage device of claim 15, having additional instructions stored which, when executed by the processor, result in operations comprising:
  when the communication session ends without the business assessment value reaching the threshold, deleting the cached copy.

17. The computer-readable storage device of claim 15, the media stream comprising audio and video content.

18. The computer-readable storage device of claim 15, wherein the analyzing of the media stream further comprises:
  flagging an event in the cached copy when a specific rule in the business rules is met, to yield a flagged segment; and
  transferring the flagged segment of the cached copy to the long-term storage.

19. The computer-readable storage device of claim 18, wherein the flagged segment has a priority in the long-term storage for later retrieval.

20. The computer-readable storage device of claim 15, wherein the media stream comprises an audio-only content stream.

* * * * *